United States Patent [19]

Boyer

[11] Patent Number: 4,695,218
[45] Date of Patent: Sep. 22, 1987

[54] AMBULATORY VEHICLE CARRIER

[76] Inventor: Elton W. Boyer, 1503 Merion, No. 48J, Seal Beach, Calif. 90740

[21] Appl. No.: 843,209

[22] Filed: Mar. 24, 1986

[51] Int. Cl.[4] .................................................. B60R 9/06
[52] U.S. Cl. ............................. 414/462; 224/42.03 R; 224/42.08
[58] Field of Search ................... 414/462, 463; 224/42.03 R, 42.03 A, 42.03 B, 42.06, 42.07, 42.08

[56] References Cited

U.S. PATENT DOCUMENTS

| | | | |
|---|---|---|---|
| 2,711,260 | 6/1955 | Butler | 414/462 X |
| 3,458,073 | 7/1969 | Dawson | 414/462 |
| 3,724,694 | 4/1973 | Wilson | 414/462 |
| 3,913,811 | 10/1975 | Spenser | 224/42.08 |

Primary Examiner—Leslie J. Paperner

[57] ABSTRACT

A carrier attachment conformed to engage the trailer hitch tail stock of a motor vehicle includes a tube segment supporting an electrical motor at the upper end engaged to a screw jack extending therethrough at the lower end. The exposed section of the screw jack is pivotally engaged to a platform deployed beneath a pivoted arm extending from the tube segment. The screw jack is of a length suffcent to raise the tube segment above ground for attachment to the tail stock.

6 Claims, 6 Drawing Figures

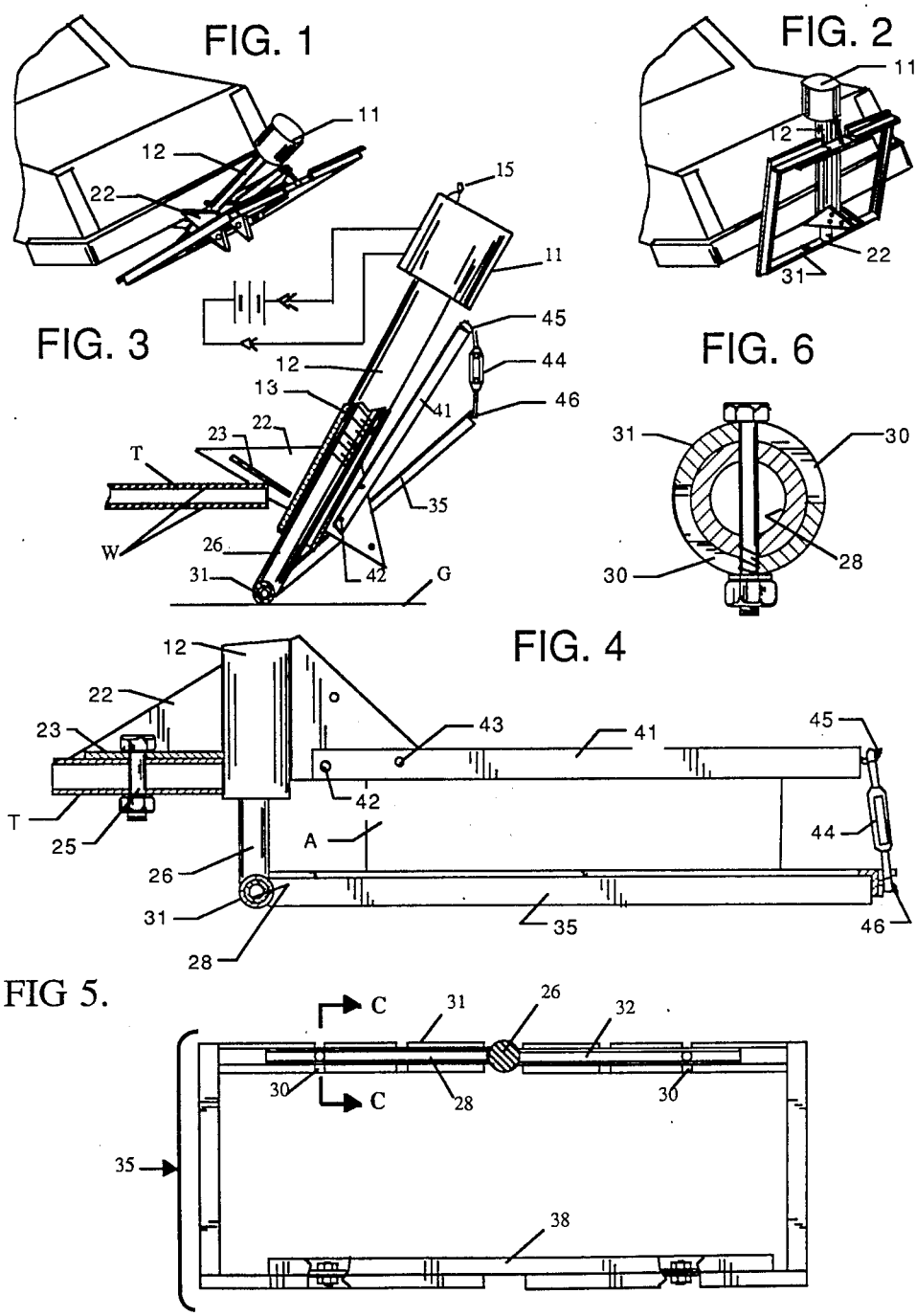

AMBULATORY VEHICLE CARRIER

BACKGROUND OF THE INVENTION

1. Field of the Invention

The present invention relates to carrier attachments for motor vehicles, and more particularly to collapsible carriers conformed to support auxiliary ambulatory vehicles.

2. Description of the Prior Art

Load carrying attachments for the rear of a motor vehicle have been known in the past. Such prior art attachments may be classified into two groups, the first including a more or less permanent structure fastened to multiple points of the vehicle body and the second comprising removeable attachments which are occasionally installed and thus require both fastening and mounting convenience.

Within this latter group a variety of carrier attachments have been devised, exemplified by the teachings of U.S. Pat. No. 3,650,443 to Haskett et al and U.S. Pat. No. 3,724,694 to Wilson. The foregoing attachments, while suitable for their purposes, entail multiple frame and truss connections and consequently require the assistance of others for mounting.

Within the populace there is a group suffering infirmities which reduce pedal and manipulative ability. Persons thus stricken, nevertheless, prefer independence and carrier attachments conformed for their use are, therefore, extensively sought. It is one such attachment that is disclosed herein.

SUMMARY OF THE INVENTION

Accordingly, it is the general purpose and object of the present invention to provide a vehicle carrier attachment which is self-powered for mounting.

Other objects of the invention are to provide a carrier conformed to lift ambulatory vehicles off ground.

Yet further objects of the invention are to provide a removeable carrier which is conveniently collapsed when mounted.

Briefly, these and other objects are accomplished within the present invention by providing a carrier assembly comprising a pivoted platform extending from the base of a powered screw jack column which, on its outer sleeve, includes a bracket conformed for suspension on the tailstock of a trailer hitch. Once suspended thereon the bracket may then be conveniently fastened and the base is then raised off ground to provide road clearance for the motor vehicle.

The bracket, moreover, extends to the opposite side of the screw jack exterior to pivotally engage a clamping arm aligned over the platform. An ambulatory vehicle can thus be lifted on the platform to be compressed against the pivoted arm and thus secured. To accommodate the foregoing attachment the pivoted arm may be pinned in a horizontal, cantelevered position or may be raised up and pinned in a vertical alignment to support, in a collapsed position, the platform connected thereto.

In this manner mounting convenience is achieved by first connecting the screw jack motor for excitation, thereby extending the base of the carrier resting on ground to align the bracket with the vehicle tail stock. Once the bracket is fixed on the tailstock the base is lifted off ground and the attachment may be used to transport any auxiliary devices.

BRIEF DESCRIPTION OF THE DRAWINGS

FIG. 1 is a perspective illustration of the inventive carrier attachment aligned for mounting;

FIG. 2 is yet another perspective illustration of the inventive carrier attachment deployed for use;

FIG. 3 is a side view, in partial section, of the inventive attachment in the course of mounting;

FIG. 4 is a side view detail illustrating the carrier attachment in use;

FIG. 5 is a plan view in partial section of the carrier platform useful herein; and FIG. 6 is a sectional detail taken along line 6—6 of FIG. 5.

DESCRIPTION OF THE PREFERRED EMBODIMENT

As shown in FIGS. 1-5 the inventive carrier attachment, generally designated by the numeral 10, includes an electric motor 11 mounted on the end of a hollow tube segment 12 to extend an internally threaded sleeve 13 into the interior thereof. Sleeve 13, by conventional means, attaches to the output shaft of the motor and thus will turn therewith. Motor 11 is of the reversible type provided with a switch 15 which when thrown to a first or second position will produce a first or second direction of rotation of sleeve 13. At the lower end tube segment 12 is welded to two lateral gussets 21 and 22 tied by a bottom plate 23 extending therebetween. The spacing between gussets 21 and 22 is selected to accommodate the width of the tail stock T of a trailer hitch assembly at the rear of a motor vehicle V.

In conventional practice tail stock T includes vertical openings W for fastening the hitch, openings which may be used for the purposes herein.

Specifically, the bottom plate 23 is similarly provided with an opening 24 conformed to align with openings W when palced thereon. A bolt 25 or any other fastener can then be inserted through the common interior, fixing the attachment 10 to the tail stock T.

Since the structure herein entails load carrying members which themselves represent weight mounting convenience is achieved by the further elements herein. Specifically, sleeve 13 engages a screw jack 26 which projects from the bottom end of segment 12 to terminate therebelow in a transverse rod 28. Rod 28, in turn, is received in the interior of two transverse tube elements 31 and 32 which together form one side of a pivotal platform generally shown at 35. In this form the platform may be expanded by outward expansion of elements 31 and 32. This outward expansion is accommodated at the opposing edge 37 of platform 35 by an edge expansion link 38.

In this form motor 11 may be first connected to the vehicle battery 3 and turned on to extend jack 26 to bring plate 23 over the tail stock. The weight of attachment 10 is thus supported on ground G requiring only little lateral support to effect alignment. Once aligned on the tail stock and fastened thereat engagement of motor 11 in an opposite direction will bring up the platform off ground. Of course, an opposite sequence will effect removal.

Thus, in accordance with the foregoing description the height of platform 35 can be conveniently selected by motor 11 either for storage or for support of articles thereon. These states of deployment are conveniently achieved by pivotal motion of platform 35 about the transverse rod 28, pivotal motion which is limited by slots 30 in segments 31 and 32 through which a pin 40 extends into the rod. Thus, as shown in FIG. 6 the angular arc of slot 30 alows for a quadrant of motion of the platform, from a horizontal, supporting alignment to a vertical alignment for storage.

Any article or ambulatory vehicle A supported on the platform 35 may be conveniently clamped by a pivotal arm 41 extending from a pivot 42 supported proximate the opposite edges of gussets 21 and 22 and pinned by a pin 43 in either a horizontal or vertical alignment. When pinned vertically, as illustrated in FIGS. 2 and 3, the arm supports the platform 35 in a stored position by way of a turnbuckle 44 connected between hooks 45 and 46, respectively, on the end of arm 41 and the expansion element 38. This same turnbuckle may be used to secure article A when the arm and platform are horizontally aligned.

In this manner only an electrical connection at a connector 51 need be made to effect all the necessary power augmentation for mounting or lifting. The attachment, therefore, is particularly suited for those suffering some infirmities, infirmities which often entail the assistance of motorized ambulation.

Obviously many modifications and changes may be made to the foregoing without departing from the spirit of the invention. It is therefore intended that the scope of the invention be determined solely on the claims appended hereto.

What is claimed is:

1. A carrier for attachment to the trailer hitch tail stock of a motor vehicle comprising:

a tubular segment having an upper and a lower end;

a reversible electrical motor connected to the upper end of said tubular segment and conformed for electrical excitation from said vehicle, said motor extending a rotary internally threaded sleeve into the interior of said segment;

a screw jack extending into the lower end of said tubular segment to threadably engage said sleeve;

an attachment bracket formed on the exterior of said tubular segment conformed for supported attachment on said tail stock, said attachment bracket being fixed on said segment at a dimension determined by the extension of said screw jack which is substantially equal to the height of said tail stock above ground.

2. Apparatus according to claim 1 wherein:

said screw jack includes a platform assembly on the exposed end thereof.

3. Apparatus according to claim 2 wherein:

said platform is pivotally engaged to the exposed end of said screw jack.

4. Apparatus according to claim 3 further comprising:

a pivoted arm extending from the exterior of said tubular segment to align above said platform.

5. Apparatus according to claim 4 wherein:

the free end of said arm is engageable to said platform.

6. Apparatus according to claim 5 wherein:

said pivotal arm includes means for fixing the pivotal motion thereof relative said tubular segment.

* * * * *